United States Patent [19]

Krop

[11] Patent Number: 5,018,830
[45] Date of Patent: May 28, 1991

[54] AUTHENTICITY MARK, DOCUMENT CARRYING SUCH MARK, AND PROCESS AND DEVICE FOR READING AND VALIDATING SUCH MARK

[75] Inventor: Hugo K. Krop, Loosdrecht, Netherlands

[73] Assignee: Homer, Hollandse Meet- En Regelsystemen B.V., Amsterdam, Netherlands

[21] Appl. No.: 418,031

[22] Filed: Oct. 10, 1989

[30] Foreign Application Priority Data

Oct. 10, 1988 [NL] Netherlands .......................... 8802472

[51] Int. Cl.$^5$ .............................................. G02B 5/128
[52] U.S. Cl. .................................... 350/105; 350/109; 40/615; 283/72
[58] Field of Search .............. 350/105, 103, 109, 113; 40/582, 583, 615; 283/72, 73, 74

[56] References Cited

U.S. PATENT DOCUMENTS

| | | |
|---|---|---|
| 3,514,872 | 11/1964 | Nordgren . |
| 3,801,183 | 4/1974 | Sevelin et al. ...................... 350/105 |
| 3,999,042 | 12/1976 | Silverman et al. . |
| 4,183,554 | 1/1980 | Howard, Jr. . |
| 4,303,307 | 12/1981 | Tureck et al. ......................... 283/72 |
| 4,620,727 | 11/1986 | Stockburger et al. ................ 283/72 |
| 4,648,932 | 3/1987 | Bailey .................................. 350/105 |
| 4,688,894 | 8/1987 | Hockert ............................... 350/105 |
| 4,763,985 | 8/1988 | Bingham .............................. 350/105 |
| 4,968,063 | 11/1990 | McConville et al. ................. 283/72 |

FOREIGN PATENT DOCUMENTS 2635795 3/1977 Fed. Rep. of Germany .
2829778 1/1980 Fed. Rep. of Germany .
2164762 3/1986 United Kingdom .

*Primary Examiner*—Bruce Y. Arnold
*Assistant Examiner*—Loha Ben
*Attorney, Agent, or Firm*—Fleit, Jacobson, Cohn, Price, Holman & Stern

[57] ABSTRACT

Authenticity mark consisting of pattern of randomly divided granules attached to a delimited surface area of a substrate. The granules consist of retroreflective microspheres with a diameter smaller than 500 micron and that the number of microspheres is selected such that between 20% and 80% of the available surface of the delimited area is covered by the microspheres.

10 Claims, 4 Drawing Sheets

AUTHENTICITY MARK, DOCUMENT CARRYING SUCH MARK, AND PROCESS AND DEVICE FOR READING AND VALIDATING SUCH MARK

FIELD OF THE INVENTION

The invention relates to an authenticity mark consisting of pattern of randomly divided granules attached to a delimited surface area of a substrate.

The invention also relates to a document comprising such authenticity mark and to a process and device for scanning and validating such authenticity mark.

BACKGROUND ART

An authenticity mark of the above mentioned type known from German Patent Specification DE 2,829,778.

In order to make it extremely difficult for unauthorized persons to copy a document such as a credit card, driving license, passport, etc, it is generally proposed that an original document should be provided with an "authenticity mark" which is difficult to copy. The authenticity mark described in the above-mentioned German Patent Specification DE 2,829,778 is formed by fluorescent granules applied to the document. These granules are disposed randomly within a linearly extending surface area of the document. If this line of fluorescent granules is illuminated by a suitable source of radiation and the line is simultaneously scanned by a suitable scanning device, the received fluorescent radiation will cause the scanning device to provide an electrical signal which will vary in amplitude in accordance with the random pattern of granules within the linearly delimited area. The varying signal is considered unique and can be used to check the authenticity of the document.

A first disadvantage of this prior art authenticity mark is the fact that the intensity of the light, received by the scanning device, will show only rather minor variations because every section of the fluorescent line, scanned by the scanning device, comprises fluorescent material. Only in case rather coarse granules are used with rather large mutual separations between each of these granules, a more pronounced intensity variation will result. The use of rather coarse granules, however, certainly if these granules are separated by rather extended intermediate void areas, gives rise to an easy falsification possibility of the document, because it is rather easy the manipulate coarse single granules with normally available means.

A second disadvantage of this prior art authenticity mark results from the fact that the intensity level of the light received from an area covered by a fluorescent granule and the intensity level of the light, received from an area, not covered by a fluorescent granule, both are comparatively low and of the same magnitude as the environmental light level. In other words, the functioning of the scanning device can be disturbed rather easily by noise or radiation from the environment. This noise problem might be reduced by using specific fluorescent granules reacting only on a very specific radiation frequency, preferably outside the frequency band of the environmental radiation, in combination with a scanning device which is sensitive only to the very specific radiation frequency. Such a combination, however, is rather costly and certainly not suited for broad scale application of the authenticity mark on documents such as for instance credit cards, passports, driving licenses, identity cards, admission passes, etc.

According to further prior art it is also possible to make an authenticity mark by embedding magnetic particles or magnetic fibers within a substrate in a random pattern. In this respect the attention is for instance drawn to DE 2.635.795 an inherent problem with the detection of such particles or fibers is that a magnetic detection head has to be used for detecting these fibers and this head has to be guided along an accurately predetermined track. Any mis-alignment between the magnetic head and the predetermined track will result into a non validity decision of the authenticity mark. Various proposals are described in the prior art literature for solving this problem.

SUMMARY OF THE INVENTION

Applicant has come to the conclusion that neither fluorescent particles nor magnetic particles (fibers) are very satisfying in the manufacturing of authorization marks. Applicant therefor started a research scheme with the object to provide an authenticity mark which is simple to produce, but is extremely difficult to copy, and the validity of which can be checked without faults, using simple equipment.

As result of this research, the invention now provides an authenticity mark consisting of a pattern of randomly divided granules attached to a delimited surface area of a substrate, which mark is characterized in that the granules consist of retroreflective microspheres with a diameter smaller than 500 microns and that the number of microspheres is selected such that between 20% and 80% of the available surface of said delimited area is covered by the microspheres.

The use of retroreflective microspheres has the advantage that the intensity level of the light received by the scanning device is significantly larger than that in the prior art proposal with fluorescent granules. Under illumination of a readily available source of radiation, such as an incandescent lamp, the intensity level of the light received from a microsphere, measured along the same optical axis, is about 50 to 100 times larger than the intensity level of the light reflected by the substrate. The color of the substrate (black, white, or any color in between) does hardly have any influence thereon. In fact, irrespective of the substrate color, under illumination the retroreflective microspheres will appear as clear white dots against a dark black background.

This significant improvement of the intensity level difference (compared with the prior art) is of course based on the fact that in general retroreflective materials have the quality to reflect incident radiation in the same direction as the incident radiation with negligible losses. Light, impinging on the substrate itself it will be scattered and partly absorbed, so that only a minor part of the radiation energy will be reflected in the direction of the radiation transmitter.

Retroreflective materials are used on a large scale in devices improving the traffic safety, in advertising projects, etc. In general these materials are formed as one integral substrate, one surface of which is shaped in such a manner that the device as a whole has retroreflective properties. A very specific retroreflective material is the retroreflective microsphere, which is an optically accurate transparent sphere comprising at one side a reflector. If light is impinging onto such a microsphere, then the sphere itself will operate as a lens (with the focal point at the surface of the sphere) such that the beam of light, impinging into this lens, will be reflected without losses in exactly the same direction as the direction of the incident light beam.

Within the scope of the invention the diameter of the microspheres is selected smaller than 500 microns, which guarantees that the random pattern in which the microspheres are attached to the substrate cannot be copied, at least not with normally available means. It is considered as impossible to manipulate a number of microspheres of these dimensions manually such that said microspheres will take predetermined, accurately defined positions within a very restricted area, for instance an area of 1×1 mm. The use of micro manipulators, which are extremely expensive and need a lot of skill to operate, is not continued as practical alternative for an eventual counterfeiter. In o(her words, the use of microspheres with a diameter smaller than 500 microns makes the authenticity mark tamper proof to a very high extent.

The invention furthermore specifies that the number of microspheres has to be selected such that between 20 and 80% of the available surface is covered by the microspheres. It will be clear that a coverage of 0% (no microspheres at all) will not result into a very unique authenticity mark and the same applies to a coverage of 100%. Practice has proven that a coverage of between 20 and 80% results into a rather large number of uniquely detectable different random patterns, sufficient to use the authenticity mark in applications in which a large number of different unique authenticity marks are necessary.

Preferably the number of microspheres is selected such that between 40% and 60% of the available surface of the delimited area, and especially approximately 50% of the area is covered by the microspheres.

The specific selection of a coverage of approximately 50% will result into a very large number of uniquely detectable random patterns.

It is remarked that as such the use of retroreflective microspheres for creating authenticity marks is already described in earlier publications. In this respect the attention is drawn to U.S. Pat. No. 3.801.183 and U.S. Pat. No. 3.154.872. The authenticity marks described therein comprise amongst others a first layer of retroreflective microspheres which in a regular pattern and with a large coverage (up to 100%) are spread within the layer and a second layer comprising an identifiable marking. Under predetermined illumination conditions the marking can be made visible. The layer of microspheres itself, however, does not comprise any identifiable marking. The microspheres are positioned in a regular pattern and this pattern as such does not comprise any information.

BRIEF DESCRIPTION OF THE DRAWING

The invention will now be explained in more detail with reference to the drawings.

DETAILED DESCRIPTION OF THE INVENTION

Figure 1:
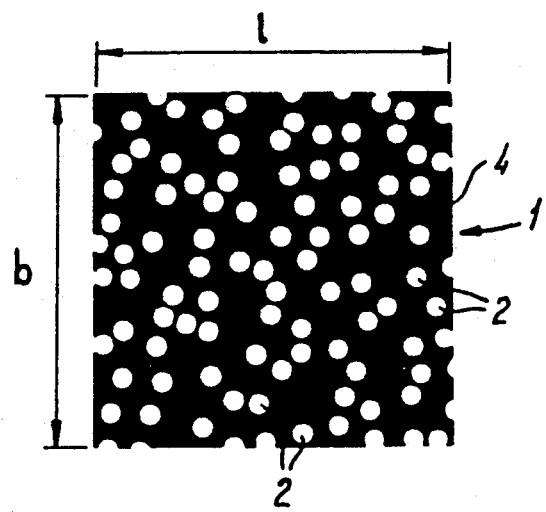
FIG. 1 illustrates an example of an authenticity mark scan picture taken by a scanning device of a mark according to the invention.

FIG. 1 shows a scan picture, taken by a scanning device of an authenticity mark 1, configured in agreement with the invention. The authenticity mark 1 covers a delimited surface area of a substrate, the surface area having a length 1 and a width b. A number of retroreflective microspheres is attached to the delimited surface. Some of these microspheres, which are imaged as white dots in FIG. 1, are indicated separately with reference number 2. Preferably the number of microspheres as well as the diameter thereof is selected such that between 20% and 80% of the total area, defined by length 1 and width b is covered by microspheres. More preferably between 40% and 60% of the available surface and especially approximately 50% of the surface is covered by microspheres.

In practical applications the microspheres are rather small, they have a maximum diameter of 500 microns and preferably they are a lot smaller, and also the dimensions 1 and b are rather small, for instance 1 is 1 mm and b is 1 mm.

Figure 2:
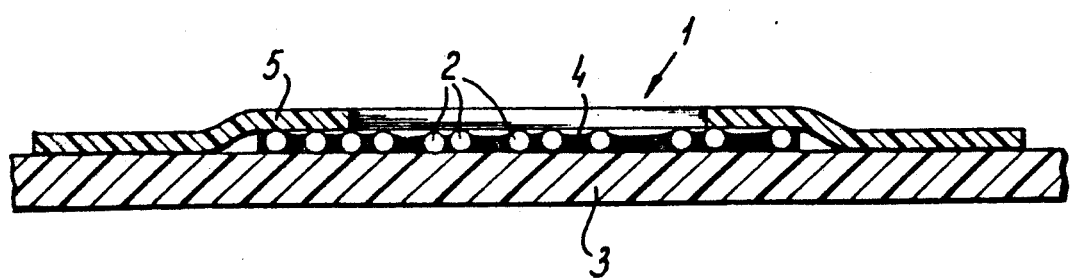
FIG. 2 provides schematically a cross-sectional view through a substrate section onto which an authenticity mark is provided.

FIG. 2 illustrates a cross-sectional view through a substrate onto which such an authenticity mark is created. The substrate is indicated by 3 and consists for instance of a part of a credit card, a passport, a driving license, etc. Onto this substrate 3 a piece of a foil 4 is adhered, for instance by a suitable adhesive. The foil 4 consists for instance of a transparent plastic or another suitable material into which the retroreflective microspheres 2 are embedded in a random pattern. After adhering the piece of foil to the substrate 3 a frame layer 5 consisting of a piece of foil material or something similar with an opening of exactly the dimensions of the desired authenticity mark is attached on top of the combination of the substrate 3 and the foil 4.

Figure 3:
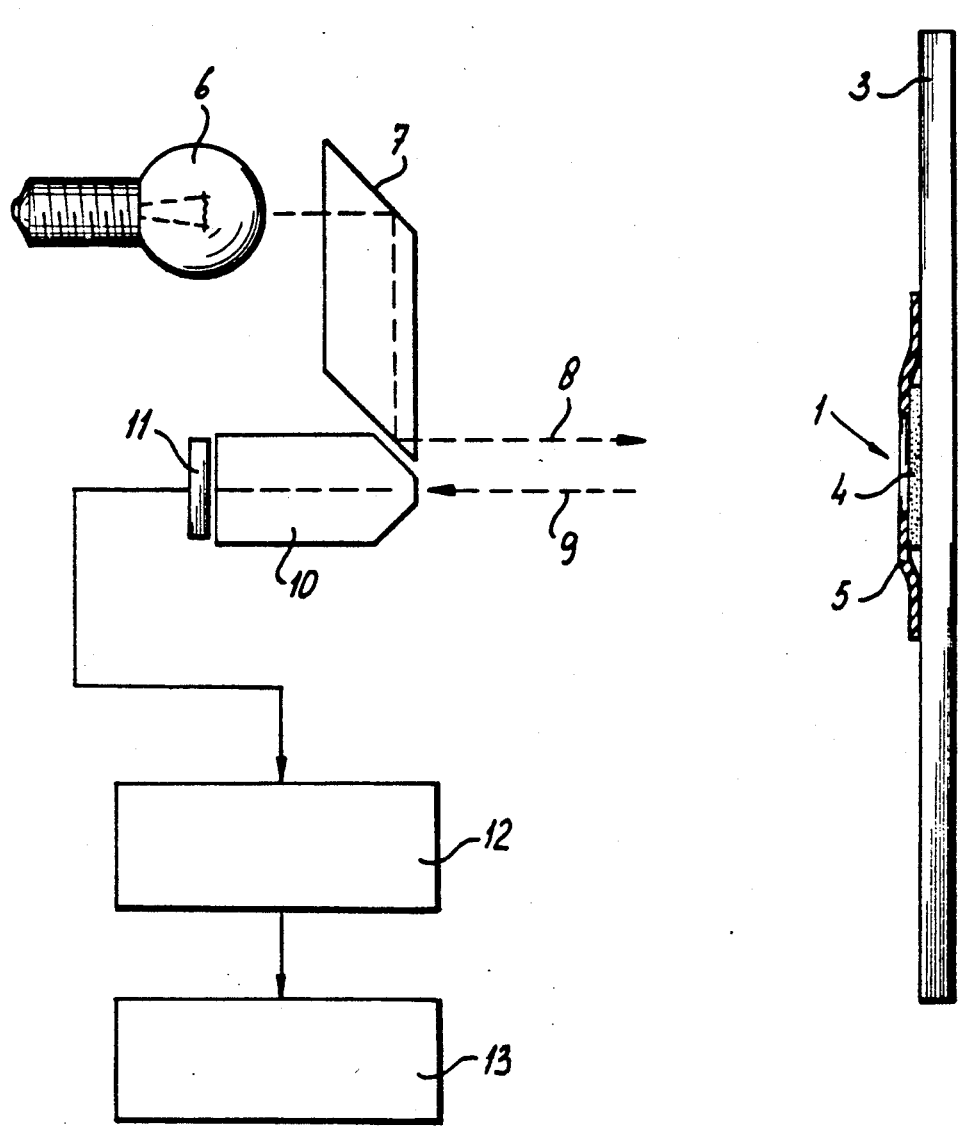
FIG. 3 illustrates very schematically a scanning device for scanning an authenticity mark according to the invention.

FIG. 3 illustrates in a very schematic way the necessary means for scanning and validating the authenticity mark on the substrate 3. At the right hand side of FIG. 3 the credit card 3 is shown again carrying the authenticity mark 1 created on the credit card 3 by attaching the foil 4, in which the microspheres 2 are embedded, to the credit card and delimiting a specific section of this foil 4 by using the frame layer 5. The apparatus for scanning the specific pattern of microspheres within the frame delimited by the frame 5 consists in principle of a light emitter 6, which during operation transmits a light beam 8 through an optical system 7 to the authenticity mark 1. The optical system 7 in this embodiment comprises a number of mirrors for deflecting the light beam 8 in a suitable way. The light, impinging onto the authenticity mark 1, will be reflected by the microspheres 2 (which in FIG. 3 are not illustrated separately), resulting in the reflected light beam 9. The direction of the light beam 9 is the same as the direction of the incident section of the light beam 8. The light beam 9 is directed by means of a light receiving optical system 10 onto an array of light sensitive detectors 11. The array of light sensitive detectors 11 supplies electrical signals to a signal converter or preprocessor 12 in which the signals are converted into a suitable format which can be processed by a further processor 13.

The array of light sensitive detection elements 11 consists for instance of a commercially available CCD-array. With such an array it is possible to "take a picture" of the authenticity mark and translate this picture into a thereto corresponding series of electrical signals, which signals are supplied to the signal converter 12. The signal convertor 12 may comprise one or more analog to digital converters by means of which the received electrical signals are digitized and formatted in such a manner that the processor 13 is able to receive and process these signals further. The processor 13 can be embodied as a normally available single chip microcomputer.

Figure 4:
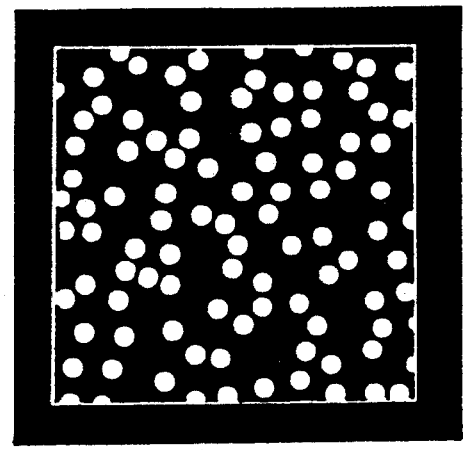
FIG. 4 illustrates the same authenticity mark as shown in FIG. 1, in combination with an imaginary boundary, calculated in the scanning device.

Before the processor 13 is able to detect the actual pattern of microspheres in the authenticity mark it will be necessary to detect and define exactly the outer boundaries of the authenticity mark 1. In practice the CCD-11 will take a picture of a surface which is somewhat larger than the actual authenticity mark 1. FIG. 4 illustrates a practical example of a picture taken with a system of the type illustrated in FIG. 3. The picture in FIG. 4 covers both the actual authenticity mark as well as a part of the surrounding frame layer 5 (and eventually part of the substrate 3).

Because the surrounding frame layer 5 is not retroreflective and because furthermore the foil 4 as well as the substrate 3 are not retroreflective all the areas not covered by retroreflective microspheres will appear as completely black background areas whereas the actual microspheres themselves will appear as clear white dots against this black background. The actual color of the frame layer 5, the foil 4 or the substrate 3 is not important because irrespective of the color the intensity level of the light reflected by the microspheres 2 is in practice 50 to 100 times higher than the intensity level received from the surrounding or intermediate areas so that under all circumstances a clear black and white picture of the type illustrated in FIG. 4 can be obtained. That implies furthermore that the system is completely insensitive to radiation from the environment. The scanning of the authenticity mark can be carried out in broad daylight without any difficulties.

Figure 5:
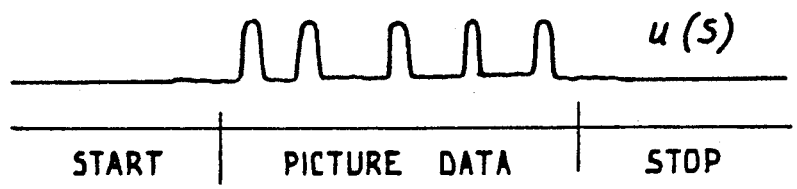
FIG. 5 shows schematically an example of a scanning signal, generated during the scanning operation of the authenticity mark.

The signals generated by the CCD device 11 are supplied to one or more A/D-converters within the preprocessor 12. The preprocessor 12 also comprises the necessary circuits to control the functioning of the CCD device. These circuits are not described in detail because the functioning thereof is considered as known to the expert in this field. It is assumed that the CCD is scanned in accordance with the normal television standard and it is furthermore assumed that the scanning lines run horizontally in the example of FIG. 4. That implies, that each scanning line will be headed by a start section in which the amplitude level is relatively low, followed by a picture data section in which high signal pulses will occur representing the bright areas in which the retroreflective microspheres are positioned, and followed by a stop section in which again the signal level will be comparatively low. FIG. 5 provides a schematical illustration of one of the scanning line signals U(s). All the scanning line signals are digitized using an analog to digital converter inside the preprocessor 12 such that a series of digital values is created in a format, which can be understood by the processor 13. All these digital values are transferred to the processor 13 for further processing.

In the processor 13 first of all a software programme is initiated for determining the actual boundaries of the authenticity mark. This software programme starts to determine for each scanning line the begin of the first white area and the end of the last white area in the line. Thereafter the software calculates two imaginary lines running parallel to each other, one functioning as a tangent line at the left side in FIG. 4 and one functioning as a tangent line on the right side in FIG. 4. Thereafter the same process is carried out for two horizontal lines, one at the upper-side of the authenticity mark and one at the lower side. The respective lines are illustrated by means of white dash-dot lines in FIG. 4. These lines are determining the actual boundaries of the authenticity mark.

Thereafter the software generates an imaginary grid overlying the actual authenticity mark in the way as is illustrated in FIG. 5. This grid determines a number of detection areas, the surface of which is of the same magnitude as the surface covered by only a few microspheres. More specifically it is preferred that the surface of each detection area is about two to three times the surface covered by one microsphere.

Figure 6:
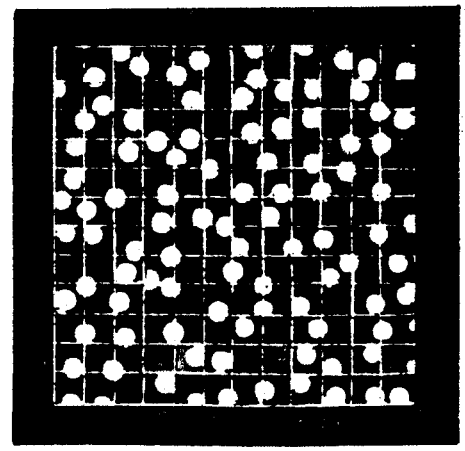
FIG. 6 illustrates the same usage as FIG. 4, now covered with an imaginary grid, determining various separate detection areas.

The total amount of light coming from each detection area is now compared with a threshold value. The average value of the collection of digital values stored for each detection area or is calculated and compared with a predetermined threshold value. The software decides if the calculated average value is above or underneath this threshold value and characterizes the detection area correspondingly with a binary zero or a binary one. The result of this operation is that for a 12×12 grid as illustrated in FIG. 6 in total 144 binary bits are generated representing the value of the authenticity mark.

To validate the authenticity mark the processor 13 needs of course information about the true value of the authenticity mark so that the detected value can be compared with this true value. This true value can be generated and stored during an initialization process in which the card is scanned for the first time and the detected value is stored for further reference.

The total number of possible different codes, which can be defined by series of 144 binary bits is 2 to the 144th power, or in decimal representation:

22.300.745.000.000.000.000.000.000.000.000.000.-
000.000.

Even if the result of the comparison, made in the processor 13 between the scanned data and the stored reference data indicates that 50% of the code bits is erroneous (for instance because of damage, dirt, or other causes) then it is still possible to validate the authenticity mark with a certainty degree of

1:4.722.400.000.000.000.000.000.

Even of 75% of the total number of 144 binary bits is become unreadable for one reason or another then still the authenticity mark can be validated with a certainty of 1; 68.719.477.000.

With reference to the exclusion of erroneous data it is preferred to carry out the above mentioned threshold comparison using two different threshold values, an upper threshold value and a lower threshold. If the average value of the collection of digital values stored for a detection area is above the upper threshold than a binary one (or zero) is assigned to the area and if the average value is below the lower threshold value than a binary zero (on one) is assigned to the area. In the case the average value is between both threshold values than the average value is considered as erroneous and is not used in the further validation procedure.

Figure 7:
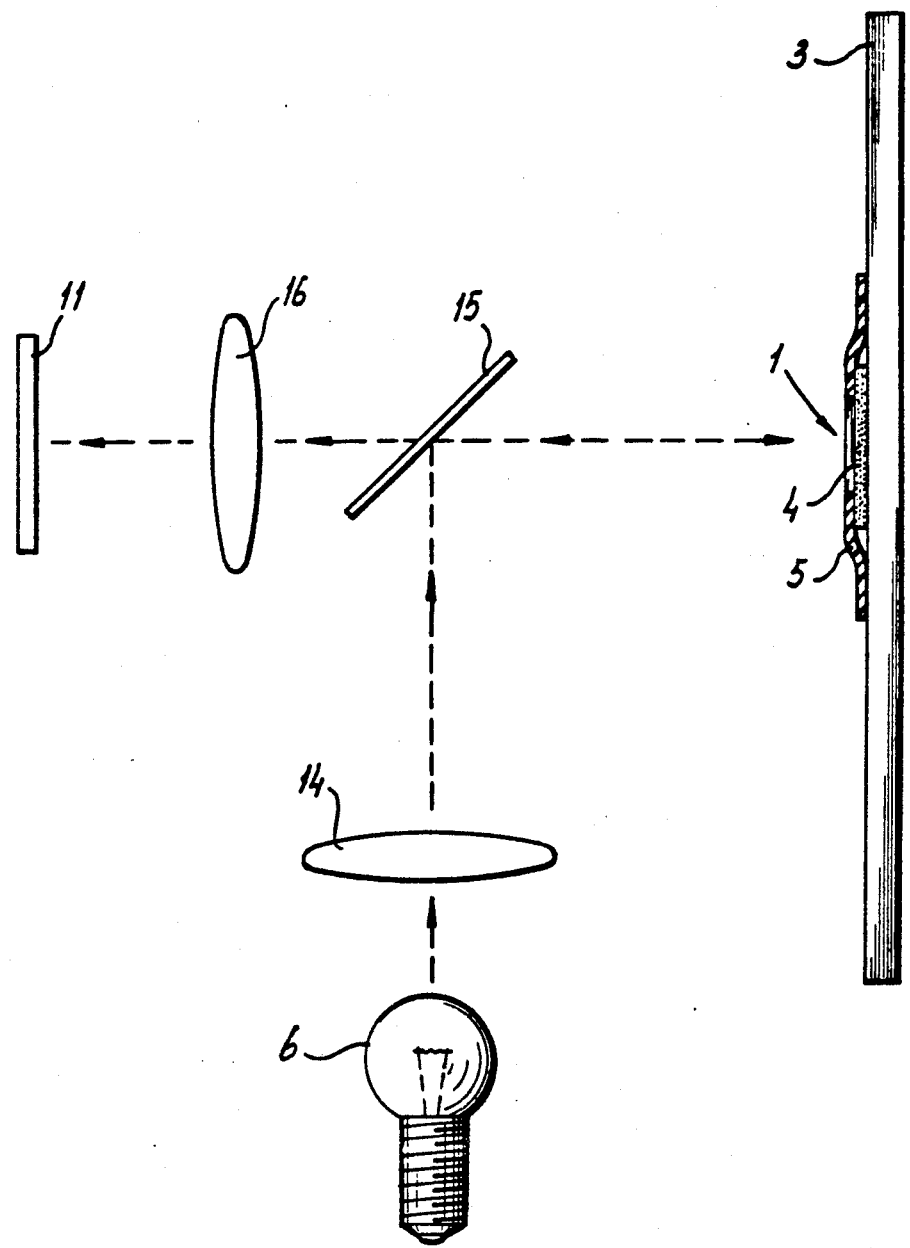
FIG. 7 illustrates very schematically a second embodiment of a scanning device for scanning an authenticity mark according to the invention.

FIG. 7 illustrates another embodiment of a scanning device, suitable to scan an authenticity mark according to the invention is illustrated in FIG. 7. This device consists of a light transmitter in the form of an incandescent lamp 6, transmitting a light beam through an optical system, represented by the lens 14 to a half transparent mirror 15. The light beam travels from the mirror 15 in the direction of the credit card 3 comprising the authenticity mark 1. Light reflected by the authenticity mark 1 is travelling back in the direction of the mirror 15 and will pass the mirror 15. Through a further optical system represented by the lens 16 the reflected light beam is impinging onto an CCD-array 11. The system for scanning the array 11 and for further processing the signals generated during the scanning process can be identical to the system components illustrated in FIG. 3.

In the above description it is assumed that the retroreflective microspheres are positioned in a random pattern within the authenticity mark. It is pointed out here, that retroreflective microspheres can be mixed with a printing ink, a varnish, screen paste or another suitable medium and can be printed or pasted onto a substrate such as a plastic foil. Plastic foils carrying such a layer of randomly divided retroreflective microspheres are commercially available and can be used to fabricate an authenticity mark according to the invention.

It is furthermore assumed above that all microspheres are embodied with a silver reflector reflecting all incoming light, however, it is also possible to use differently colored reflectors in combination with CCD-array in the scanning device which responds to various colors. The use of microspheres with different colors will enlarge the number of available different codes enormously.

Furthermore the attention is drawn to the fact that the boundary of the authenticity mark can have various shapes. In the examples illustrated in FIGS. 1, 4 and 6 the authenticity mark is defined by a square boundary of 1×1 mm. The boundary, however, can have any shape which is desirable. However, rectangular shapes are preferred. The choice of the shape will mainly depend on the dimensions of the available foil material and the possibility to cut or stamp an accurately defined hole into the frame layer 5, and the amount of data required from the authenticity mark.

What is claimed is:

1. Authenticity mark consisting of pattern of randomly divided granules attached to a delimited surface area of a substrate, wherein the granules consist of retroreflective microspheres with a diameter smaller than 500 microns and that the number of microspheres is selected such that between 20% and 80% of the available surface of said delimited area is covered by said microspheres.

2. Authenticity mark according to claim 1, wherein the number of microspheres is selected such that between 40% and 60% of the available surface of said delimited area, and especially approximately 50% of said area, is covered by said microspheres.

3. Authenticity mark according to claim 1 wherein the diameter of said microspheres is smaller than 100 microns.

4. Authenticity mark according to claim 3 wherein said delimited surface area is delimited by a frame of predetermined dimensions surrounding said delimited surface area.

5. Authenticity mark according to claim 4, wherein the microspheres are applied to the area in a transparent medium.

6. Authenticity mark according claim 5, wherein the transparent printing medium is selected from one of the materials ink, varnish or screen paste.

7. Authenticity mark according to claim 6, wherein the substrate is made of a material which can easily be adhered to a predetermined document.

8. Authenticity mark according to claim 7, wherein reflectors of the microspheres have different colors.

9. Document comprising an authenticity mark s defined in claim 8, wherein the substrate is adhered to said document at a predetermined position.

10. Document comprising an authenticity mark described in claim 9, wherein the substrate forms part of said document.

* * * * *